UNITED STATES PATENT OFFICE.

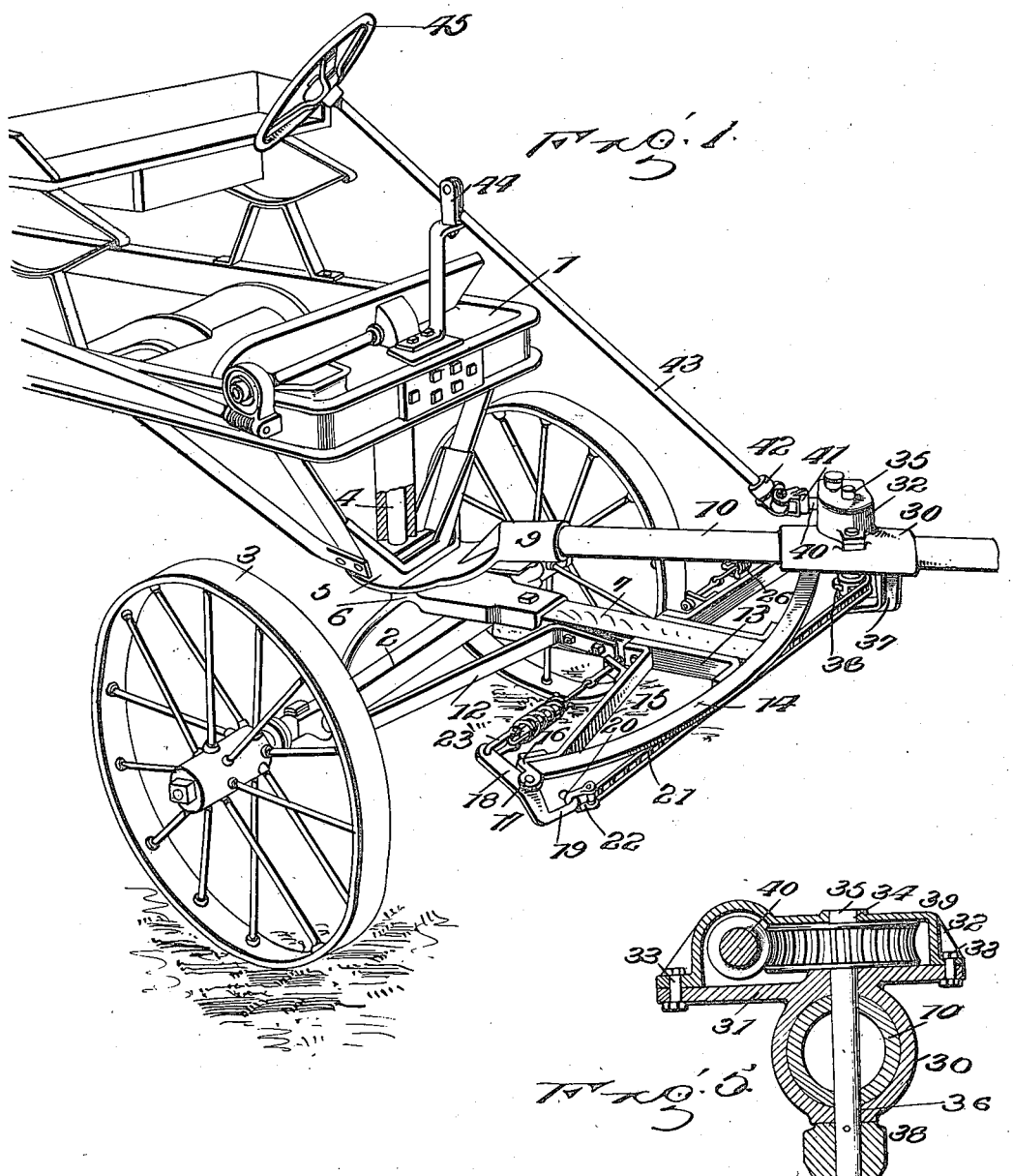

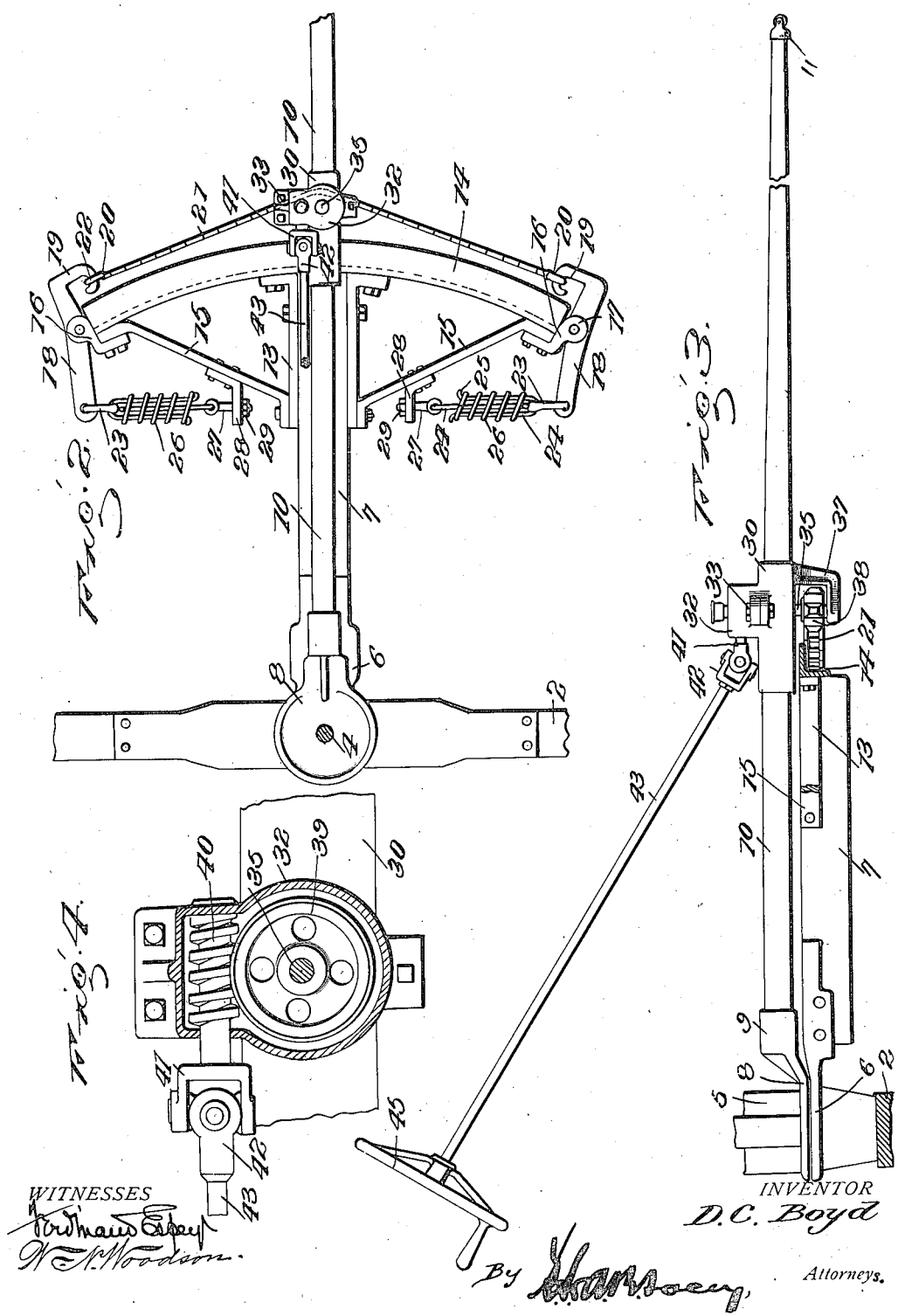

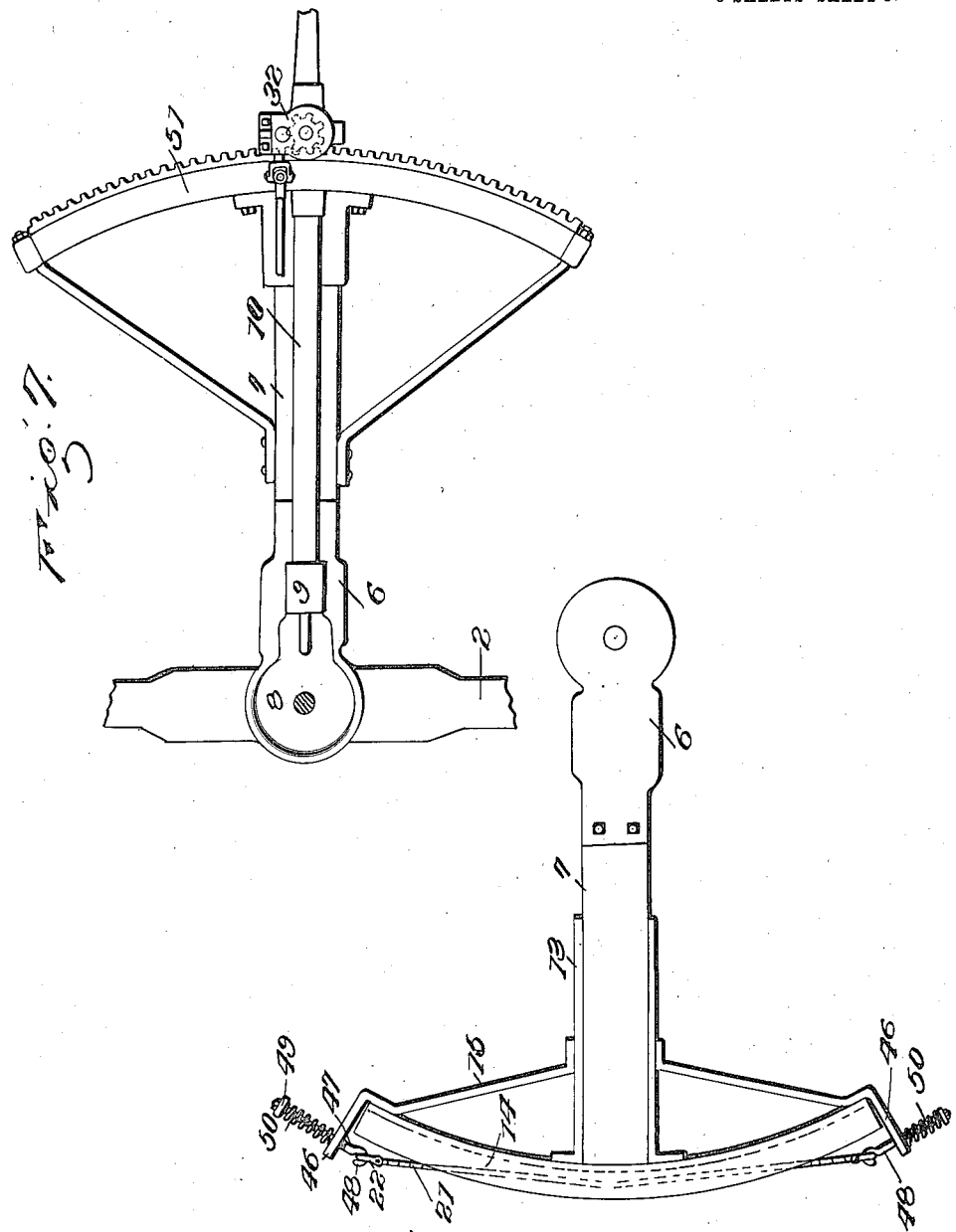

DAVID C. BOYD, OF GALION, OHIO, ASSIGNOR TO THE GALION IRON WORKS AND MANUFACTURING COMPANY, OF GALION, OHIO, A CORPORATION OF OHIO.

STEERING-GEAR FOR ROAD-MACHINES.

1,130,471. Specification of Letters Patent. Patented Mar. 2, 1915.

Application filed November 13, 1912. Serial No. 731,097.

*To all whom it may concern:*

Be it known that I, DAVID C. BOYD, citizen of the United States, residing at Galion, in the county of Crawford and State of Ohio, have invented certain new and useful Improvements in Steering-Gears for Road-Machines, of which the following is a specification.

This invention relates to steering gear for road machines.

It is customary, in the use of road graders and other similar road machines, to draw the same by means of a traction engine, and it has been found necessary in order that the best results may be obtained, that the engine travel in the center of the road, a maximum traction force being in this manner secured. Inasmuch as the grader must travel at the sides of the road, it is necessary that some means be provided for maintaining its line of travel regardless of the relative position of the traction engine. The present invention, therefore, aims to provide a steering mechanism for this purpose which may be readily and quickly operated; which will not be liable to become disarranged; and, which will require no locking devices for holding it at adjustment. In all of the various types of steering mechanism employed in this connection at the present time, means is provided for locking the mechanism after it has been adjusted, and not only does the provision of such means render it necessary for the operator to perform two separate and distinct operations in changing the line of travel of the machine, but the locking mechanism is invariably so located that it is subjected to considerable strain and is liable to become broken or disarranged.

The present invention contemplates so arranging the gearing which communicates motion between the steering rod and the steering mechanism proper, that the mechanism as a whole will be locked after adjustment, and in this manner the provision of a separate locking means is obviated.

A further object of the invention is to provide, in a steering mechanism of the class described, means for absorbing the shocks to which the mechanism is subjected and to, consequently, adapt the mechanism for use where the road surface is extremely uneven and the steering wheels of the road machine are repeatedly subjected to twisting motion.

In the accompanying drawings: Figure 1 is a perspective view of the steering mechanism embodying the present invention, applied to a road machine; Fig. 2 is a top plan view of the mechanism shown in Fig. 1; Fig. 3 is a side elevation thereof; Fig. 4 is a horizontal sectional view through the gear casing of the mechanism; Fig. 5 is a vertical sectional view through the said casing; Fig. 6 is a plan view illustrating a slight modification of the invention; Fig. 7 is a view similar to Fig. 6 illustrating a further modification.

Corresponding and like parts are referred to in the following description and indicated in all the views of the accompanying drawings by the same reference characters.

In the form of the invention shown in Figs. 1 to 5 inclusive, the body of the road machine upon which the steering mechanism is arranged, is indicated in general by the reference numeral 1, and the forward axle is indicated at 2 and is supported at its ends by the usual wheels 3 which are the steering wheels of the machine. The axle is mounted to turn upon the usual king bolt 4, and this bolt passes through members 5 and 6 of a fifth wheel, these members being carried respectively by the body 1 of the road machine and by the axle 2. The members 6 of the fifth wheel structure supports a steering arm 7 which may be the ordinary tongue of the machine foreshortened.

Disposed between the fifth wheel members 5 and 6 is a flat-sided head 8 having a forwardly extending socketed arm 9 into which is fitted and secured the rear end of a draft pole 10 provided at its free or forward end with a clevis 11 for attachment to the draw beam of the traction engine (not shown). By referring to Fig. 2 of the drawings, it will be observed that the king bolt passes through the head 8, and it will be understood that the said head has turning movement between the sections of the fifth wheel so that the draft pole 10 may assume various angular positions with relation to the steering arm 7.

By referring to Figs. 1 and 2 of the drawings, it will be observed that the steering arm 7 is braced with relation to the axle 2 by means of braces 12 connected at their forward ends to opposite sides of the said arm and at their rear ends to the axle 2. Bracket plates 13 are secured upon opposite sides of the steering arm at the forward end thereof, and attached at its intermediate portion to the forward ends of the bracket plates 13 is an arcuate angle-iron bar 14 having horizontally and vertically disposed wings. It will be observed that the convex side of the bar 14 is presented forwardly and that the bar is held securely in position by means of braces 15 which are secured at their forward ends to the ends of the said bar and at their rear ends to the rear ends of the plates 13. A bracket 16 is secured at each end of the bar 14 and is provided with spaced pintle lugs 17 between which is pivotally mounted a rock lever 18. The forward end of each of the levers 18 is extended laterally inwardly, as at 19, and terminates in a hook 20, and a sprocket chain 21 extends in front of the bar 14 and is provided at its ends with clevises 22 engaging the hooked ends 20 of the rock levers. Connected with the rear end of each of the rock levers 18 is a link 23 which is connected in turn with one of a pair of spring compressing members 24, these members being of the ordinary U-form and provided at the ends of their arms with hooks 25 arranged to engage the ends of the spring to be compressed, this spring being indicated in the drawings by the numeral 26. The other one of the members 24 of each pair of the spring compressing devices is connected with an eye-bolt 27 having its shank fitted through an ear 28 projecting rearwardly from the respective or adjacent brace 15. A nut 29 is threaded upon each of the eye-bolts and bears against the respective ear 28 and may be turned for the purpose of adjusting the said bolt, it being understood that by adjustment of the nuts upon the bolts the tension of the springs 26 may be varied. From the foregoing, it will be observed that the springs 26 serve to tension the sprocket chain 21, and it will presently be made apparent that these springs serve also to absorb the sudden shocks and strains imposed upon the chain.

Fitted upon the draft pole 10 is a sleeve 30, upon the upper side of which is formed the base 31 of a gear casing, the body of which casing is indicated at 32 and is secured in place upon the base 31 by means of suitable bolts 33. The body of the casing 32 is formed with an opening 34 in which is fitted the upper end of a spindle 35 which extends through registering openings 36 in the sleeve 30 and draft pole 10, and at its lower end is seated in an opening in a bracket arm 37 formed integral with the under side of the sleeve 30 and extending downwardly and rearwardly therefrom. A small sprocket gear 38 is fixed for rotation with the shaft 35 at the lower end of the latter, and fixed upon the said shaft at its upper end and lying within the casing 32, is a worm pinion 39. Rotatably journaled in the casing at one side thereof and meshing with the pinion 39 is a short worm shaft 40, one end of which projects through the wall of the casing and is provided with one member 41 of a universal joint. The other member of the universal joint is indicated by the numeral 42 and is fixed at the forward end of a steering rod 43 supported within a suitable bracket 44 upon the body of the machine 1. The rod 43 carries at its rear end a hand wheel 45 which may be grasped by the operator of the machine and rotated for the purpose of imparting movement to the gears 39 and 38. By referring to Figs. 1, 2, and 3 of the drawings, it will be observed that the sprocket chain 21 is trained around the gear 38. From the foregoing description of this form of the invention, it will be understood that the worm shaft 40 may be rotated through the medium of the steering rod 43 and hand wheel 45 and that, when rotated, the pinion 39 will revolve in one direction or the other, imparting like movement to the sprocket gear 38. It will further be apparent that rotation of the gear 38 will result in a pull being exerted in one direction or the other upon the sprocket chain 21 which will serve to swing the steering arm 7 to the right or left, whereby to properly position the wheels 3 to attain the desired line of travel. It will also be understood that the springs 26 serve not only to hold the sprocket chain 21 taut and firmly in engagement with the sprocket gear 38, but they also serve to absorb shocks and sudden strains imposed upon the chain due either to a quick rotative movement of the steering hand wheel 45 or to twisting movement imparted to the wheel 3 due to irregularities in the road surface. Above all, it will be noted that it is unnecessary to provide any means whatsoever for holding the mechanism at adjustment for the reason that the gear 39 will be locked at every point in its rotating movement by the worm 4, and that, while the mechanism is as positively locked as if a separate and distinct latch device were employed, nevertheless, it is only necessary for the operator of the machine in order to change or vary the adjustment of the mechanism, to rotate the hand wheel 45.

In that form of the invention shown in Fig. 6 of the drawings, the braces 15 have their end portions bent to extend beside the ends of the arcuate bar 14 and to project forwardly beyond the said ends, as at 46, and these projecting ends of the braces are formed with ears through which are fitted bolts 47 provided at their inner ends with hooks 48 with which are engaged the clevises 22 of the chain 21, this chain in this form of the invention being trained about the sprocket gear 38 in the same manner as in the previously described form. A nut 49 is adjustably threaded upon each of the bolts 47, and arranged upon each bolt between the respective nut 49 and the end 46 of the brace through which the bolt is fitted, is a compression spring 50. The springs 50 serve precisely the same function as the springs 26, and it will be understood that by adjusting the nuts 29 the tension of the springs may be varied in the same manner as by adjusting the nuts 29 in the previously described form of the invention. It is to be understood, of course, that while the remainder of the steering mechanism has not been shown in Fig. 6, it is arranged in the same manner as shown in Figs. 1 to 5 inclusive.

In that form of the invention illustrated in Fig. 7 of the drawings, the arcuate bar 14 is replaced by an arcuate rack 51 which is mounted in substantially the same manner as the arcuate bar 14 and which meshes directly with the pinion 38. Aside from the substitution of this rack 51 for the chain 21, the mechanism is constructed and arranged in the same manner as previously described.

From the foregoing description of the invention, it will be understood that by rotating the hand wheel 45, rotary movement will be imparted to the pinion 38 and the rotation of this pinion will result in a swinging of the steering arm to the right or the left, depending upon the direction of rotation of the hand wheel. It will, therefore, be understood, inasmuch as the gear means provided for rotating the pinion 38 is of the worm type, it will automatically lock at all points of adjustment and, consequently, the provision of a separate and distinct locking means is obviated and the adjustment of the steering mechanism is accomplished by the operator in a single operation, namely, by rotating the hand wheel to the right or to the left. It will also be understood from the foregoing and from an inspection of Figs. 1 to 6 inclusive that the springs serve to hold the chain 21 taut at all times although it may yield in one direction or the other to a sufficient degree to absorb sudden shocks and strains to which the mechanism is subjected while the machine upon which it is mounted is traveling over an uneven road surface. It is to be particularly noted in connection with the first-described form of the invention that the springs are so located that they will not be liable to be injured by contact with objects passed by the road grader. It will further be apparent that not only does the provision of gearing of the worm type in the connection herein shown provide for a positive locking of the mechanism at all points of its adjustment, but less exertion is required from the operator in adjusting the mechanism.

By the term "gear element" as used in the appended claims is meant a sprocket chain or cable or any other flexible device suitable for use in this connection, and it will be understood that a pulley and cable might be employed under some conditions in place of the sprocket and sprocket chain, if desired, although the illustrated structure is to be preferred.

Having thus described the invention what is claimed as new is:—

1. In steering mechanism of the class described, a steering member including a transversely extending support, a rock-lever mounted at each end of the support, a draft element, a gear mounted upon the draft element, means for rotating the gear, a flexible gear element connected at its ends with one end of each of the rock-levers, and shock absorbing means connected with the other end of each rock-lever.

2. In steering mechanism of the class described, a steering member including a transversely extending support, a rock-lever mounted at each end of the support, a draft element, a gear mounted upon the draft element, means for rotating the gear, a flexible gear element connected at its ends with one end of each of the rock-levers, and means connecting with the other end of each rock-lever for yieldably holding the flexible gear element taut.

3. In steering mechanism of the class described, a steering member including a transversely extending support, a rock-lever mounted at each end of the support, a draft element, a gear mounted upon the draft element, means for rotating the gear, a flexible gear element connected at its ends with one end of each of the rock-levers, and means connected with the other end of each rock-lever for taking up slack in the flexible gear element.

4. In steering mechanism of the class described, a steering member including a transversely extending support, a rock-lever mounted at each end of the support, a draft element, a gear mounted upon the draft element, means for rotating the gear, a flexible gear element connected at its ends with one end of each of the rock-levers, and means connected with the other end of each rock-lever tending to yieldably hold the rock-levers in position to hold the flexible gear element taut.

5. In steering mechanism of the class described, a steering member, a draft element, the steering member having a transverse head, a rotatable gear element for the draft element, spaced attaching members upon the head of the steering member, a flexible gear element extending between the said attaching members and coöperating with the rotatable gear element, and springs coöperating with the attaching members and the said flexible gear element to hold the gear element taut.

6. In steering mechanism of the class described, a steering member including an arcuate head having a forwardly presented convex side, a draft element, a rotatable gear carried by the draft element, a chain meshing with the gear and extending longitudinally in advance of the arcuate head of the steering member, attaching members arranged at opposite ends of the head, the said chain being operatively connected with the said attaching members, and springs coöperating with the attaching members to hold the chain taut.

In testimony whereof I affix my signature in presence of two witnesses.

DAVID C. BOYD. [L. S.]

Witnesses:
C. E. Fox,
Dean C. Talbott.